United States Patent [19]
Böhme et al.

[11] Patent Number: 6,137,935
[45] Date of Patent: Oct. 24, 2000

[54] METHOD FOR FABRICATING AN OPTICAL CABLE

[75] Inventors: Ralph Böhme, Mönchengladbach; Dieter Wichura, Wegberg; Klaus Nothofer, Erkrath, all of Germany

[73] Assignee: Alcatel, Paris, France

[21] Appl. No.: 09/060,910

[22] Filed: Apr. 15, 1998

[30] Foreign Application Priority Data

Apr. 24, 1997 [DE] Germany .......................... 197 17 313

[51] Int. Cl.[7] ................. G02B 6/44; B29D 11/00
[52] U.S. Cl. ................. 385/109; 385/113; 264/1.28; 264/1.29
[58] Field of Search ................. 385/109, 112–114; 264/1.28, 1.29; 57/3, 9, 14

[56] References Cited

U.S. PATENT DOCUMENTS

| 5,082,719 | 1/1992 | Arroyo | 385/107 |
| 5,201,020 | 4/1993 | Kannabiran | 385/113 |
| 5,390,273 | 2/1995 | Rahman et al. | 385/113 |
| 5,748,823 | 5/1998 | Nave | 385/114 |

OTHER PUBLICATIONS

Der Vorteil liegt in der Luft, Hermann Gotschy, Siemens AG, Bereich Offentliche Kommunikationsnetze Munchen, pp. 170–172, Telecom Report 17 (1994) vol. 4.

*Primary Examiner*—Hemang Sanghavi
*Attorney, Agent, or Firm*—Ware, Fressola, Van der Sluys & Adolphson LLP

[57] ABSTRACT

In a method for producing an optical cable (1), at least one optical fiber (3), is surrounded by an extruded tubular sheath (5) which comprises an inner layer (7) and an outer layer (9) and is produced in a single operational step. Tension elements (11, 11') are embedded in the tubular sheath (5) for increasing the tensile strength of the tubular sheath (5). The optical cable made by the method of the invention is particularly suited for applications as an indoor cable and as a non-self-supporting cable for installation on ground wires or phase wires of high voltage transmission lines.

9 Claims, 3 Drawing Sheets

METHOD FOR FABRICATING AN OPTICAL CABLE

BACKGROUND OF THE INVENTION

1. Technical Field

The invention relates to a method for fabricating an optical cable comprising at least one optical fiber surrounded by a tubular sheath, wherein an inner layer and an outer layer of the tubular sheath are extruded together around the optical fiber in a single operating step.

2. Description of the Prior Art

The attenuation of optical fibers increases when the fibers are stretched, bent and/or twisted. Moreover, fibers can only tolerate a slight elongation before breaking and can thus be damaged at comparatively low mechanical stress. Optical fibers can therefore be employed successfully only if external influences are minimized, which is accomplished by surrounding the fibers with a suitable sheath. Conventionally, one or several optical fibers are placed inside a tubular sheath made of a plastic tube. Tubular sheaths of this type must have sufficient mechanical strength and good aging characteristics, while still providing adequate flexibility. In order to satisfy these requirements, dual layer plastic tubes are commonly employed which consist of an inner layer with a very low friction coefficient and an outer layer which is mechanically stable and resists aging. Such dual layer tubular sheaths are usually fabricated in a continuous process using two consecutive extruders. It is further known to simplify the manufacturing process by using co-extrusion with a single extrusion machine, so that the two layers of a dual layer sheath which loosely surrounds one or more optical fibers can be fabricated in a single operating step. To prevent water or other fluids from migrating along the tubular sheath if an optical buffer tube or multi-fiber buffer tube is damaged, the tubular sheath can be filled with a suitable thixotropic substance.

Various cable designs are used for the different applications and installation methods of optical cables. For example, in telecom report 17 (1994), Vol. 4, pages 170 to 172, there is depicted an aerial cable which includes an aramide thread lapping which is applied over a central multi-fiber buffer tube formed by a tubular sheath containing a plurality of optical fibers, for relieving tensile stress to the cable, and an outer jacket. Due to the aramide thread lapping and the outer jacket, the diameter of the cable is much larger than the diameter of the multi-fiber buffer tube.

SUMMARY OF THE INVENTION

It is therefore an object of the invention to provide an optical cable with a smaller outside diameter and reduced weight, which enables a plurality of optical fibers to be arranged so as to protect the fibers from mechanical stress.

This object is solved by the invention by embedding tension elements in the tubular sheath, or by introducing tension elements in the tubular sheath during extrusion of the inner layer and the outer layer.

Most advantageously, the optical cable of the present invention consists only of a single tubular sheath and optical fibers extending inside the tubular sheath. Moreover, the tubular sheath of the optical cable does not require armor or an outer jacket, so that both the outside diameter and the weight per unit length are reduced. The optical cable can accommodate a large number of optical fibers even with a small outside diameter of the tubular sheath. The tension elements embedded in the tubular sheath of the cable provide adequate tension relief for the optical fibers. The optical cable of the invention can be used as an interior cable, more particularly as a non-self-supporting cable for installation on a support wire, for example a ground wire or a phase wire of a high voltage transmission line. In the latter application, the reduced weight and the smaller outside diameter of the optical cable make installation particularly simple and cost-effective, so that by using conventional cable laying and cable installation devices, remarkably long optical cables can be installed on a support wire secured to masts. Moreover, the optical cable of the invention can be installed easily and cost-effectively.

Advantageously, the tension elements are placed in the region between the inner layer and the outer layer of the tubular sheath, so that the tension elements can be easily introduced in the tubular sheath of the optical cable which is comprised of the single tubular sheath and the optical fibers extending inside the tubular sheath, to provide effective tension relief. The tensile strength of the two layers of the tubular sheath increases proportionally.

In another advantageous embodiment, tension elements are introduced in the outer layer of the tubular sheath.

If the optical cable is installed on a phase wire or a ground wire of a high tension line, then the inner layer of the tubular sheath is advantageously formed of a high-temperature resistant plastic with a melting temperature of at least 160° C. This ensures that the tubular sheath provides reliable mechanical protection of the optical fibers even at higher thermal loads.

To satisfy these requirements, the inner layer of the tubular sheath is advantageously formed of a polyamide. Moreover, polyamides advantageously provide a smooth surface, thereby preventing damage to an optical fiber upon contact with the inner wall of the tubular sheath.

The outer layer of the tubular sheath of the optical cable of the invention which is the outermost layer and thus simultaneously functions as an outer jacket, is preferably formed of a plastic which has a high mechanical strength and is resistant to UV light and chemicals. When the optical cable is installed on a phase wire or ground wire of a high voltage transmission line, the outer layer of the tubular sheath is most advantageously made of a plastic resistant to leakage currents.

The invention is illustrated schematically in the drawings and described in greater detail in the following description.

DETAILED DESCRIPTION OF THE INVENTION

Figure 1:
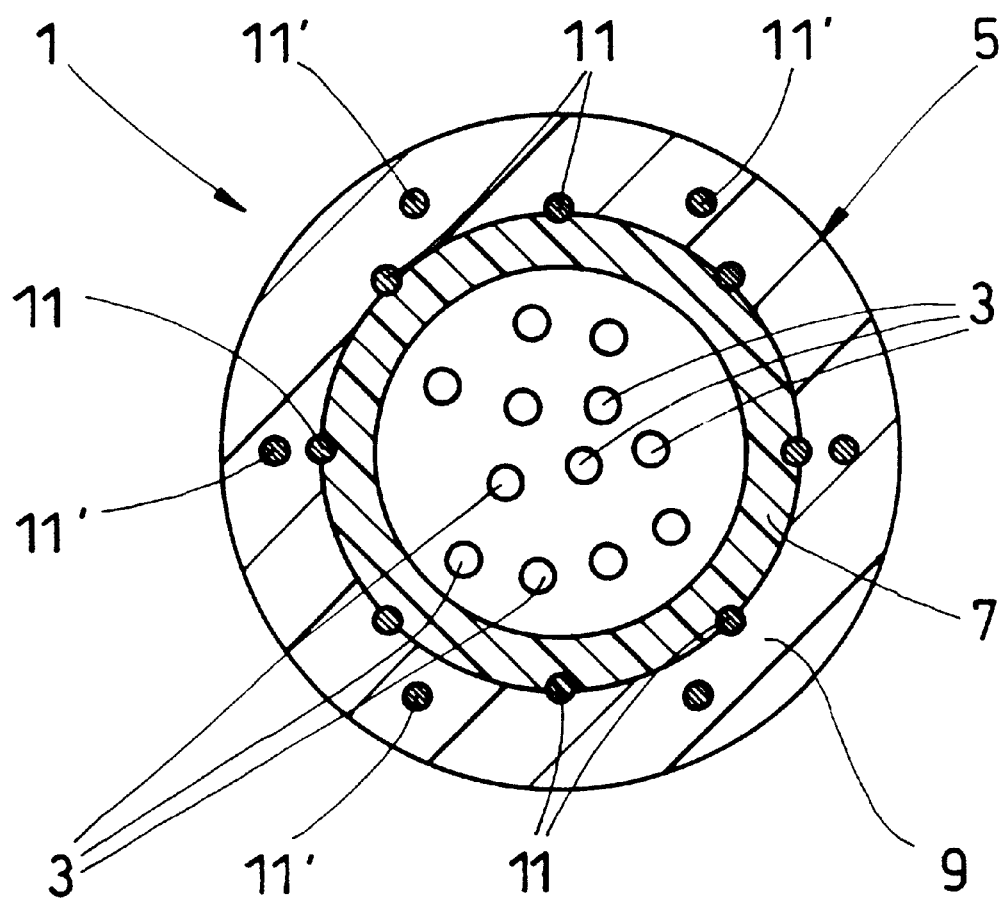
FIG. 1 is a cross-sectional view of an embodiment of an optical cable made by the invention.

The optical cable 1, which is shown in the form of an example in FIG. 1, is particularly suited for applications requiring a non-self-supporting optical aerial cable for attachment to a ground wire or to a phase wire of a high voltage transmission line. The optical cable 1 comprises a plurality of optical fibers 3 which are surrounded by a single common tubular sheath 5. The optical fibers 3 can have a length of more than 10% in excess of the tubular sheath 5. The tubular sheath 5 is formed by an inner layer 7 made of plastic, followed by a directly superimposed outer layer 9 which is also made of plastic; both layers are extruded in a common operating step. Tension elements 11 which extend in the longitudinal direction of the optical cable, are embedded, for example, in the tubular sheath 5 in the region between the inner layer 7 and the outer layer 9. In the illustrated embodiment, tension elements (11') which also extend in the longitudinal direction of the optical cable, are embedded in the outer layer 9 of the tubular sheath 5. The tension elements 11 and 11' are, for example, aramide fibers or elements comprising aramide fibers. However, other elements with a high tensile strength can also be used. The tubular sheath 5 can be filled with a suitable thixotropic substance to protect the optical fibers 3 from moisture.

The inner layer 7 of the tubular sheath 5 is, for example, formed from a plastic with a smooth surface and the highest possible percentage of amorphous material and a correspondingly high glass transition temperature of at least 100° C., such as a semi-crystalline polyamide. For an outdoor installation of the optical cable 1, the material used for outer layer 9 of the tubular sheath 5 which is also forming the outer layer of the optical cable 1, is preferably resistant to UV light and chemicals, has a high mechanical strength and also a high resistance to leakage currents. A preferred material for the outer layer 9 is, for example, polypropylene. Alternatively, the outer layer 9 can also be made of a suitable polyethylene or fluoropolymer.

Figure 2:
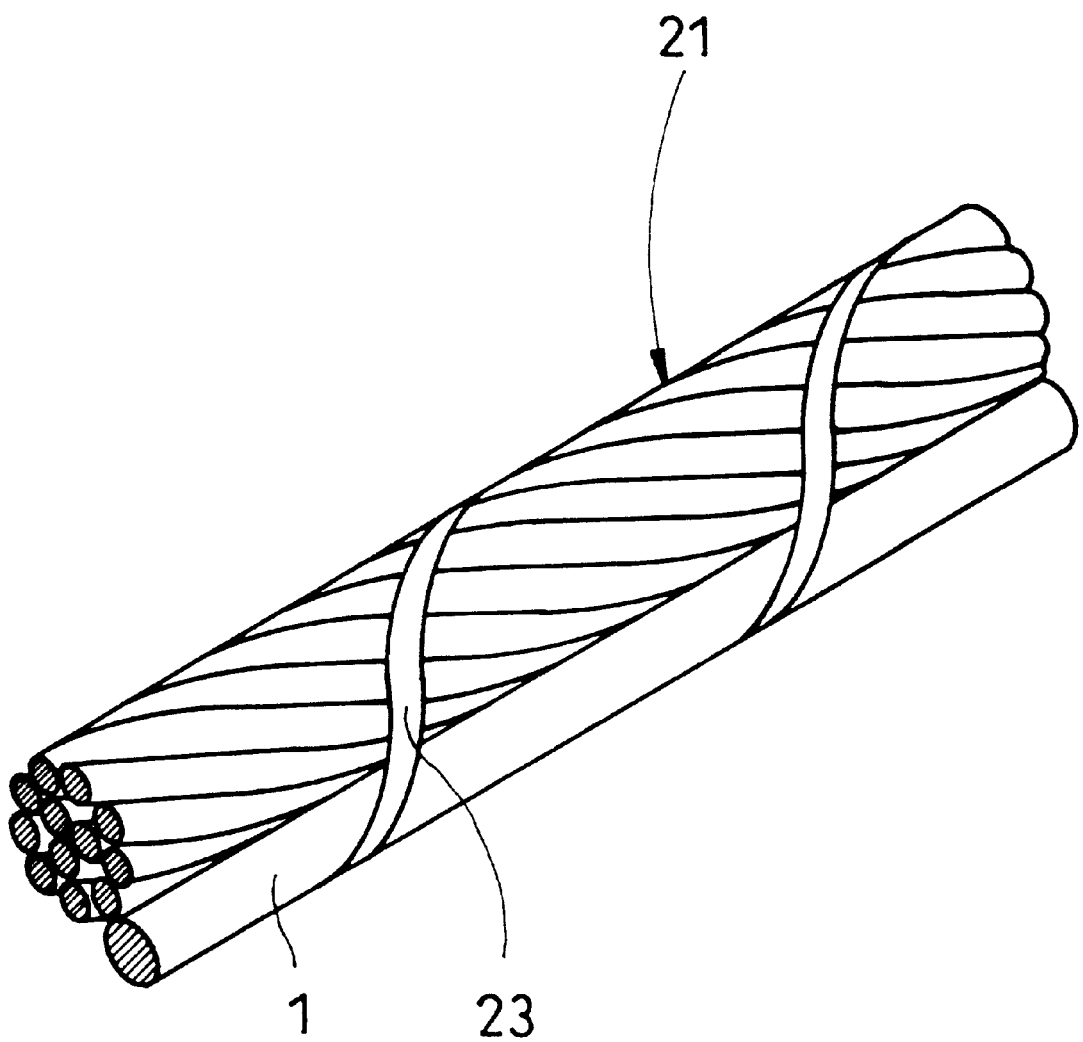
FIG. 2 is a perspective view of the installation of an optical cable made by the invention on a support element.

In FIG. 2 there is shown an optical cable 1 according to the invention which is secured to a support wire 21. The support wire 21 can be, for example, a ground wire or a phase wire of a high voltage transmission line. The optical cable 1 is secured to the support wire 21 with a retaining tape 23 which is helically wound around both the support wire 21 and the optical cable 1.

Figure 3:
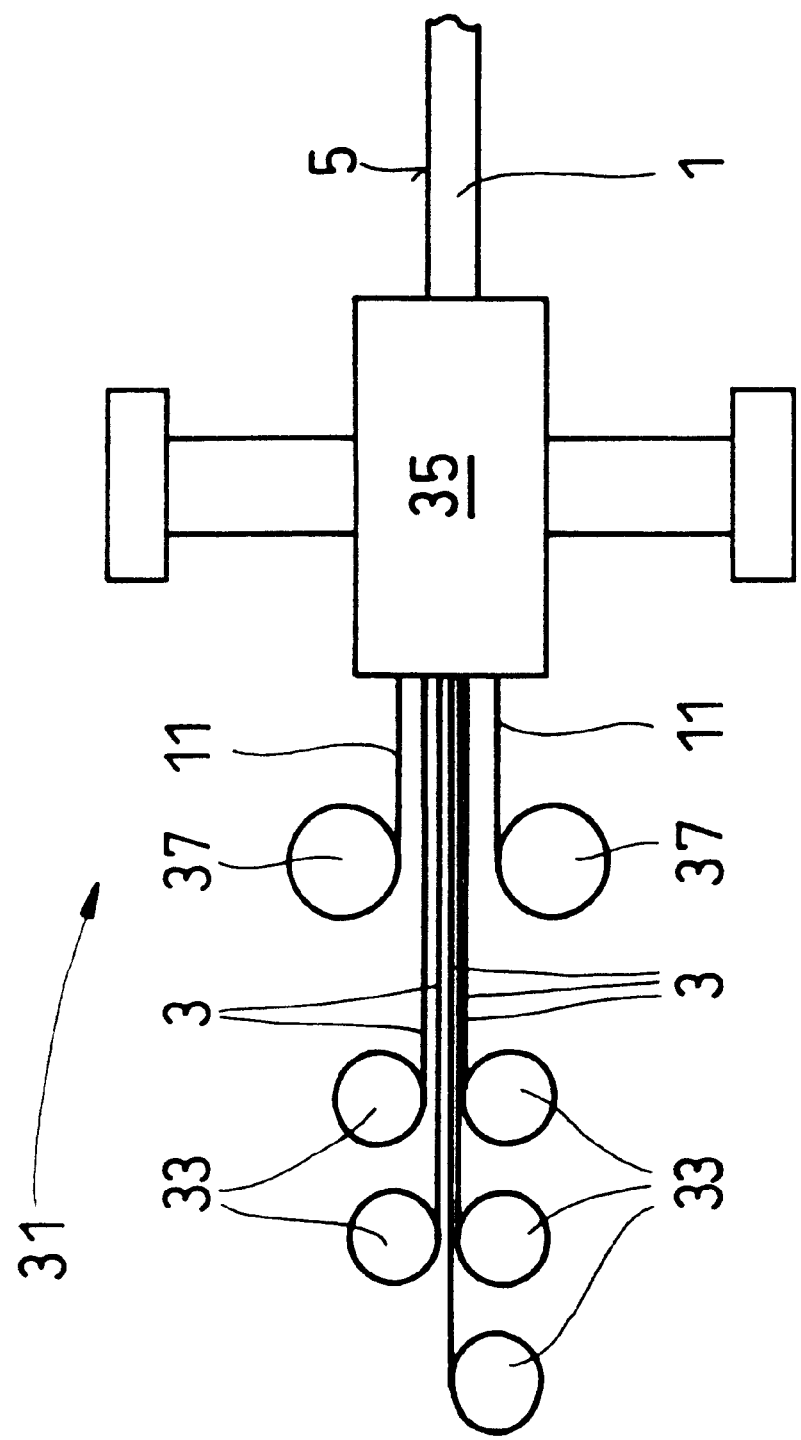
FIG. 3 is a schematic view of a device for manufacturing an optical cable of the invention.

In FIG. 3 there is shown an exemplary embodiment of a device 31 for manufacturing the optical cable 1 of the invention. With this device 31, the optical fibers 3 are withdrawn from supply reels 33 and conveyed to an extruder 35. In the present example, tension elements 11 and 11', respectively, which are withdrawn from respective supply drums 37, are conveyed to the extruder 35 in parallel with the optical fibers 3. The extruder 35 has, for example, two storage containers containing the plastic materials for the inner layer 7 and the outer layer 9 of the tubular sheath 5 and two barrel extruders. In the extruder 35, an inner layer 7 and an outer layer 9 which in combination form a dual layer tubular sheath 5, are extruded simultaneously around the optical fibers 3 in a single operating step using a common injector head. Such a common extrusion of two layers is also referred to as co-extrusion. During the extrusion process, the tension elements 11 and 11', respectively, which extend parallel to the optical fibers 3, can be introduced from supply reels 37 and embedded in the tubular sheath 5 at the same time the sheath is formed.

After extrusion, an optical cable 1 is formed which has tension elements 11 and 11' embedded in the tubular sheath 5, a very small outside diameter and adequate strength for a variety of applications.

The preferred embodiment described above admirably achieves the objects of the invention. However, it will be appreciated that departures can be made by those skilled in the art without departing from the spirit and scope of the invention which is limited only by the following claims.

What is claimed is:

1. Method of fabricating an optical cable comprising the steps of:
   (a) providing at least on optical fiber;
   (b) extruding a tubular sheath around the at least one optical fiber, the tubular sheath having an inner layer and an outer layer extruded together around the at least on optical fiber in a single operating step; and
   (c) introducing tension elements into the tubular sheath in a transition region between the inner layer and the outer layer during the extrusion of the inner layer and the outer layer.

2. Method according to claim 1, wherein the tension elements are introduced into the outer layer of the tubular sheath.

3. Method according to claim 1, wherein the tension elements are first and second tension elements, the first tension elements are introduced in the tubular sheath in a transition region between the inner layer and the outer layer, the second tension elements are embedded in the outer layer.

4. Method according to claim 1, wherein the inner layer of the tubular sheath is made of a plastic resistant to high temperatures.

5. Method according to claim 4, wherein the plastic of the inner layer of the tubular sheath has a melting temperature of at least 160° C.

6. Method according to claim 5, wherein the inner layer of the tubular sheath is made of a polyamide.

7. Method according to claim 1, wherein the inner layer of the tubular sheath is made of a polyamide.

8. Method according to claim 4, wherein the outer layer of the tubular sheath is made of a plastic resistant to leakage currents.

9. Method according to claim 1, wherein the outer layer of the tubular sheath is made of a plastic resistant to leakage currents.

* * * * *